United States Patent
Patel et al.

(10) Patent No.: US 8,543,076 B2
(45) Date of Patent: Sep. 24, 2013

(54) ADAPTIVE USE OF MULTIPLE RECEIVE CHAINS IN WIRELESS COMMUNICATION TERMINALS

(76) Inventors: Bhaskar Patel, San Clemente, CA (US); Arumugam Govindswamy, Irvine, CA (US)

( * ) Notice: Subject to any disclaimer, the term of this patent is extended or adjusted under 35 U.S.C. 154(b) by 929 days.

(21) Appl. No.: 12/217,859

(22) Filed: Jul. 9, 2008

(65) Prior Publication Data
US 2009/0017766 A1  Jan. 15, 2009

Related U.S. Application Data (60) Provisional application No. 60/958,720, filed on Jul. 9, 2007.

(51) Int. Cl.
*H04B 1/06* (2006.01)
(52) U.S. Cl.
USPC .............. 455/277.2; 455/562.1; 455/132; 455/127.5; 455/279.1; 455/133; 455/135; 375/347
(58) Field of Classification Search
USPC .......... 455/574, 127.5, 343.1–343.5, 67.11, 455/67.12, 67.14, 67.15, 226.1–226.4, 132–140, 455/272, 273, 277.1, 277.2, 278.1, 562.1, 455/279.1; 375/347
See application file for complete search history.

(56) References Cited

U.S. PATENT DOCUMENTS

| | | | |
|---|---|---|---|
| 7,925,230 B2 * | 4/2011 | Ruckriem | 455/140 |
| 2005/0075081 A1 * | 4/2005 | Catreux-Erceg et al. | 455/78 |
| 2006/0023669 A1 * | 2/2006 | Yamaura et al. | 370/335 |
| 2008/0051046 A1 * | 2/2008 | Ruckriem | 455/132 |

* cited by examiner

*Primary Examiner* — Junpeng Chen
(74) *Attorney, Agent, or Firm* — Lerner, David, Littenberg, Krumholz & Mentlik, LLP

(57) ABSTRACT

A wireless communication device is adaptively operated in a wireless communication network. The wireless communication device includes a receiver subsystem having a total number of available receive chains $R_T$. Current signal conditions are determined at the wireless communication device for signals transmitted by a given base station over the wireless communication network. Current system information regarding the wireless communication device and regarding the wireless communication network are determined. Based on the current signal conditions and the current system information, a minimum number of receive chains needed to receive and successfully decode data transmitted by the base station over the wireless communication network is determined. Specific ones of the total number of available receive chains $R_T$ are selected such that the minimum number of receive chains needed to receive and successfully decode the transmitted data is selected.

26 Claims, 11 Drawing Sheets

FIG. 1

(Prior Art)

FIG. 2

(Prior Art)

FIG. 3

(Prior Art)

FIG. 4

(Prior Art)

ADAPTIVE USE OF MULTIPLE RECEIVE CHAINS IN WIRELESS COMMUNICATION TERMINALS

CROSS-REFERENCE TO RELATED APPLICATIONS

This application claims the benefit of U.S. Provisional Application No. 60/958,720 filed Jul. 9, 2007 and entitled "Adaptive Use of Multiple Receive Chains to Reduce Power Consumption in Wireless Communication Terminals," the entire disclosure of which is hereby expressly incorporated by reference herein.

BACKGROUND OF THE INVENTION

The present invention relates generally to wireless communication systems and, more particularly, to mobile station receiver architectures and methods that employ multiple receive chains.

Figure 1:
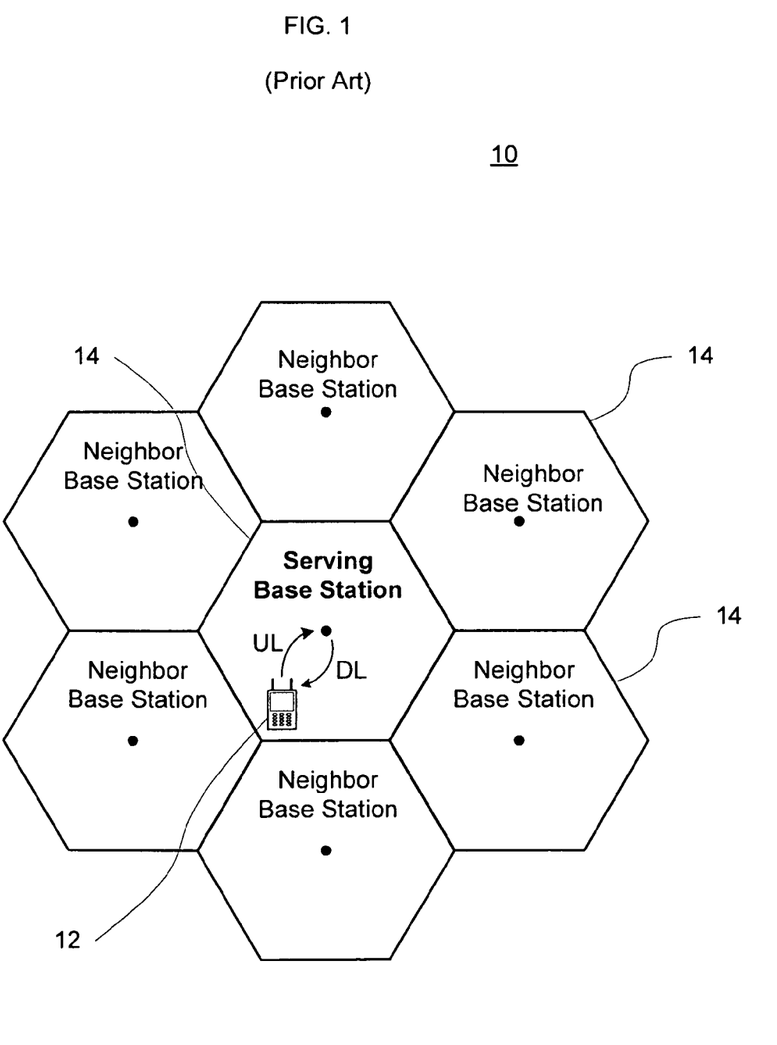
FIG. 1 is a diagram illustrating a layout of a conventional wireless cellular communication system.

Typically, as shown in FIG. 1, a wireless communication system 10 comprises elements such as a client terminal or mobile station 12 and one or more base stations 14. Other network devices may also be employed, such as a mobile switching center (not shown). As illustrated, the communication path from the base station 14 ("BS") to the client terminal or mobile station ("MS") 12 is referred to herein as a downlink ("DL") direction, and the communication path from the client terminal 12 to the base station 14 is referred to herein as an uplink ("UL") direction. In some wireless communication systems, the MS 12 communicates with the BS 14 in both the DL and UL directions. For instance, such communication is carried out in cellular telephone systems. In other wireless communication systems, the client terminal communicates with the base stations in only one direction, usually the DL. Such communication may occur in applications such as paging.

Figure 2:
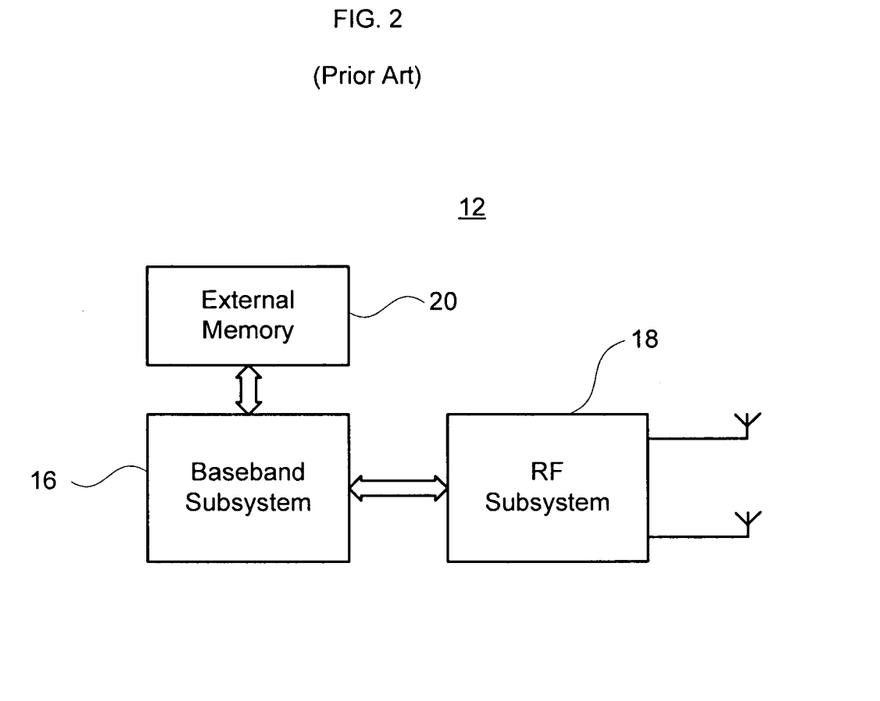
FIG. 2 is a block diagram which illustrates a conventional wireless mobile station.

FIG. 2 shows the client terminal 12 in greater detail. The client terminal/MS 12 typically includes a baseband subsystem 16 and a radio frequency ("RF") subsystem 18. A memory unit, such as an external memory 20, may be connected to the baseband subsystem 16.

Figure 3:
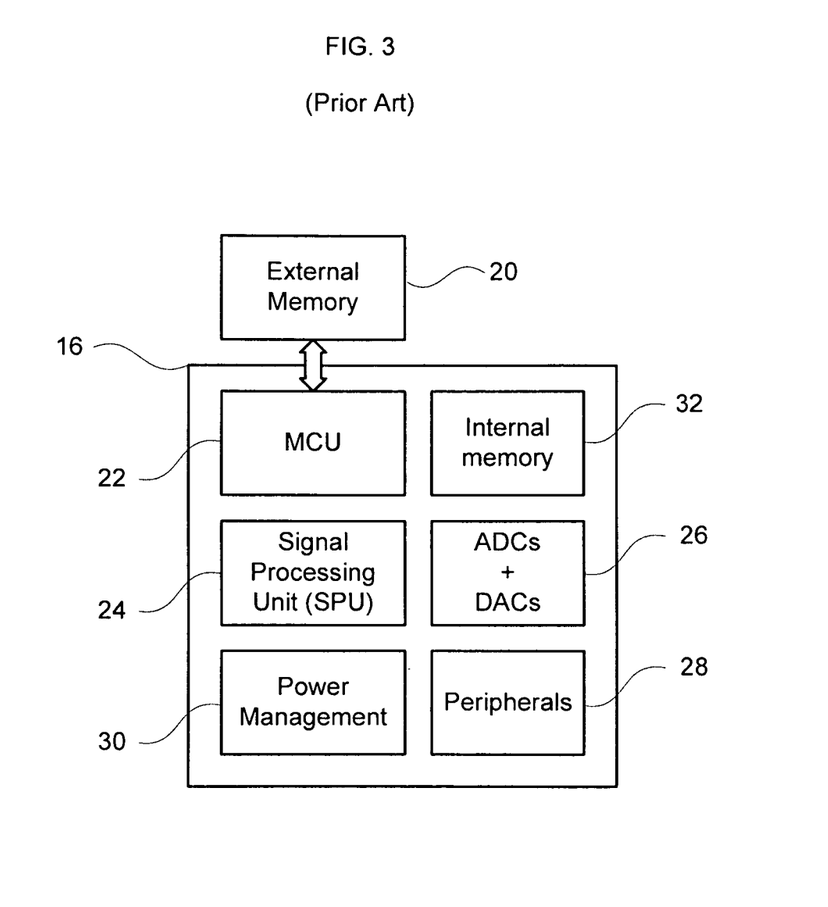
FIG. 3 is a block diagram which illustrates a baseband subsystem for the wireless mobile station shown in FIG. 2.

FIG. 3 shows an example of a baseband subsystem in greater detail. The baseband subsystem 16, typically includes a micro controller unit ("MCU") 22, a signal processing unit ("SPU") 24, data converters 26, various peripherals 28, a power management unit 30, and internal memory 32. The SPU 24 may be formed of one or more digital signal processors ("DSP"), hardware ("HW") accelerators, co-processors, or a combination of the above. Normally, the overall control of the baseband subsystem is performed by software running on the MCU 22, and the processing of signals is carried out by the SPU 24.

Of the converters 26, analog to digital converters ("ADCs") are provided to convert a received analog signal into a digital signal which enables the baseband subsystem to process it. Also, digital to analog converters ("DACs") are provided to convert the processed baseband digital signal into an analog signal for transmission. The ADCs and DACs are collectively referred to herein as the "data converters." Such data converters can either be part of the baseband subsystem or part of the RF subsystem, and depending on their location, the interface between the two subsystems will be different. The location of the data converters, however, does not alter the overall function of the client terminal.

Figure 4:
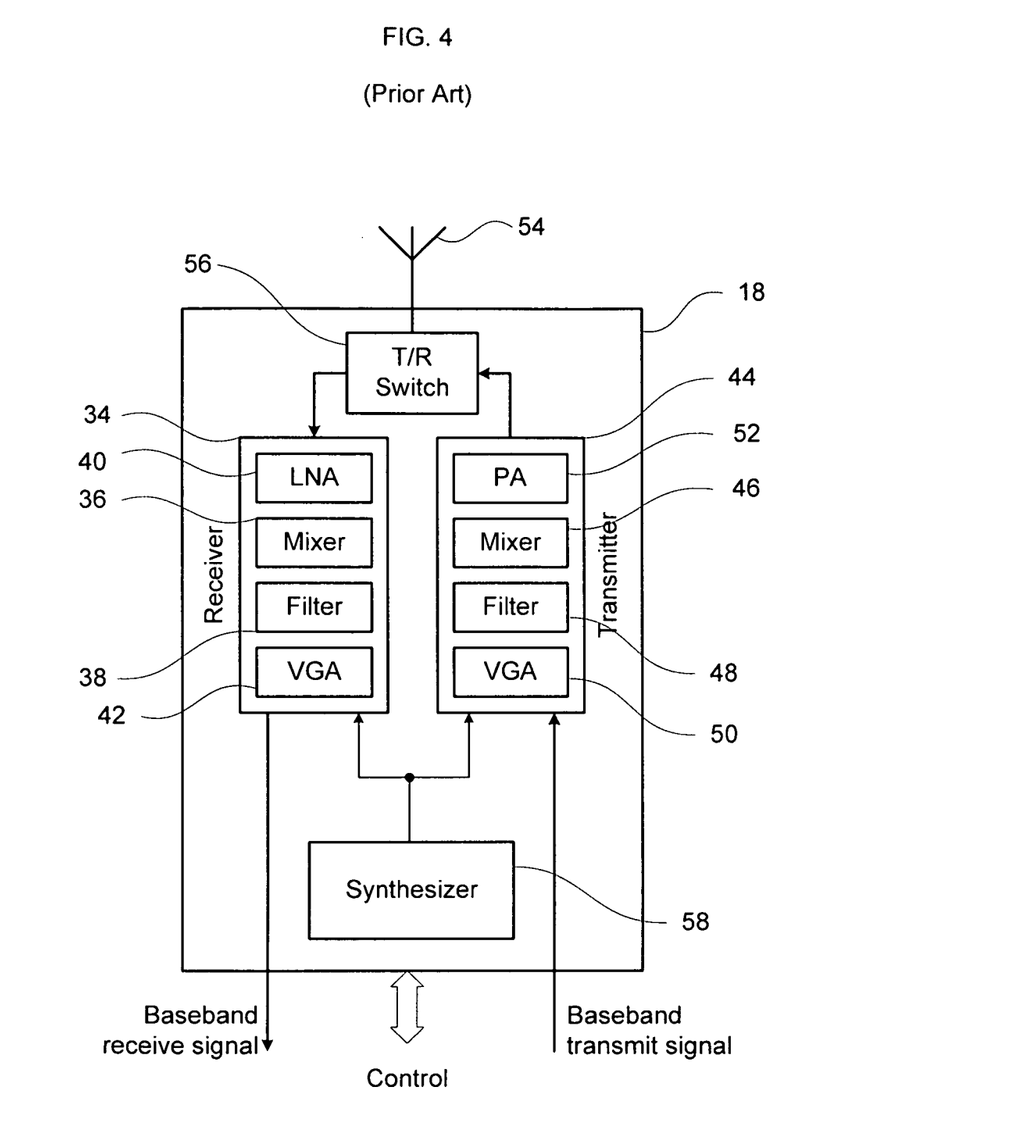
FIG. 4 is a block diagram which illustrates an RF subsystem for the wireless mobile station shown in FIG. 2.

FIG. 4 shows an example of an RF subsystem in greater detail. The RF subsystem 18 typically includes a receiver 34, a transmitter 44, a synthesizer 58, a power amplifier 52, an antenna 54, and other components. The RF subsystem 18 shown in FIG. 4 is for a time division duplex ("TDD") system. The receiver section 34 converts the signal from RF to baseband and includes mixers 36, filters 38, low noise amplifiers ("LNAs") 40 and variable gain amplifiers ("VGAs") 42. The transmitter section 44 converts the baseband signal to the RF signal and includes mixers 46, filters 48, and gain control VGAs 50. Power amplification of the transmit signal is typically carried out by a separate power amplifier ("PA") unit 52 but is considered part of the transmit RF chain. In some architectures, some of the above components of the receiver and transmitter sections are shared. The receiver section 34 and the transmitter section 44 are coupled to an antenna 54 via a transmit/receive (T/R) switch 56. The synthesizer 58 is also shown as being coupled to the receiver section and to the transmitter section.

Down conversion in the receiver and up conversion in the transmitter can be performed using a single stage or using multiple stages, each leading to different implementations of the RF subsystems. One possible implementation is known as direction conversion or zero intermediate frequency ("IF") wherein the downlink RF signal is converted to a baseband signal by a single mixer and local oscillator ("LO"). Another implementation employs a super-heterodyne structure which uses one or more IF stages and LOs for converting the RF signal to the baseband signal. Yet another implementation uses an approach called "low IF" that converts the analog RF signal to an analog low intermediate frequency signal and then convert the analog intermediate frequency signal to a digital signal using high speed data converters.

Often, multiple receive and transmit chains are used in these wireless communication systems in order to improve their performance. Such performance improvement can be shown in terms of better coverage, higher data rates, the multiplexing of multiple users on the same channel and at the same time, or some combination of the above.

Figure 5:
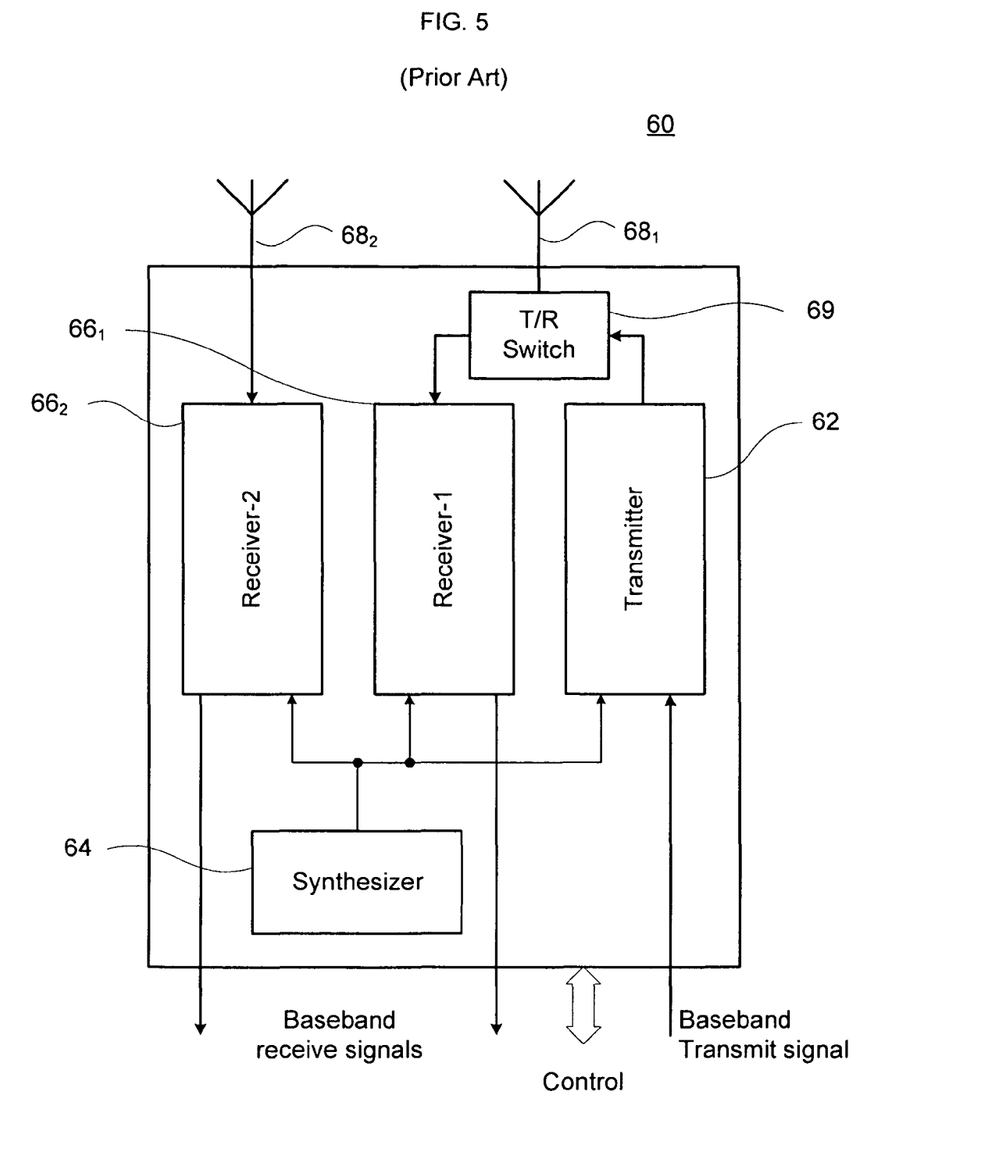
FIG. 5 is a block diagram which illustrates an RF subsystem for a known wireless mobile station having two receive chains.

FIG. 5 illustrates an RF subsystem 60 with two RF receive chains. The RF subsystem includes a transmitter 62, a synthesizer 64, and a pair of receivers $66_1$ and $66_2$. One of the receivers $66_1$ and the transmitter 62 are coupled to a first antenna $68_1$ via a transmit/receive switch 69. The other receiver $66_2$ is connected to a second antenna $68_2$. Different techniques for using multiple receive and/or transmit chains are often referred to with different names, such as diversity combining (maximum ratio combining, equal gain combining, selection combining, etc.), space-time coding or space-time block coding, or multiple input multiple output ("MIMO").

Figure 6:
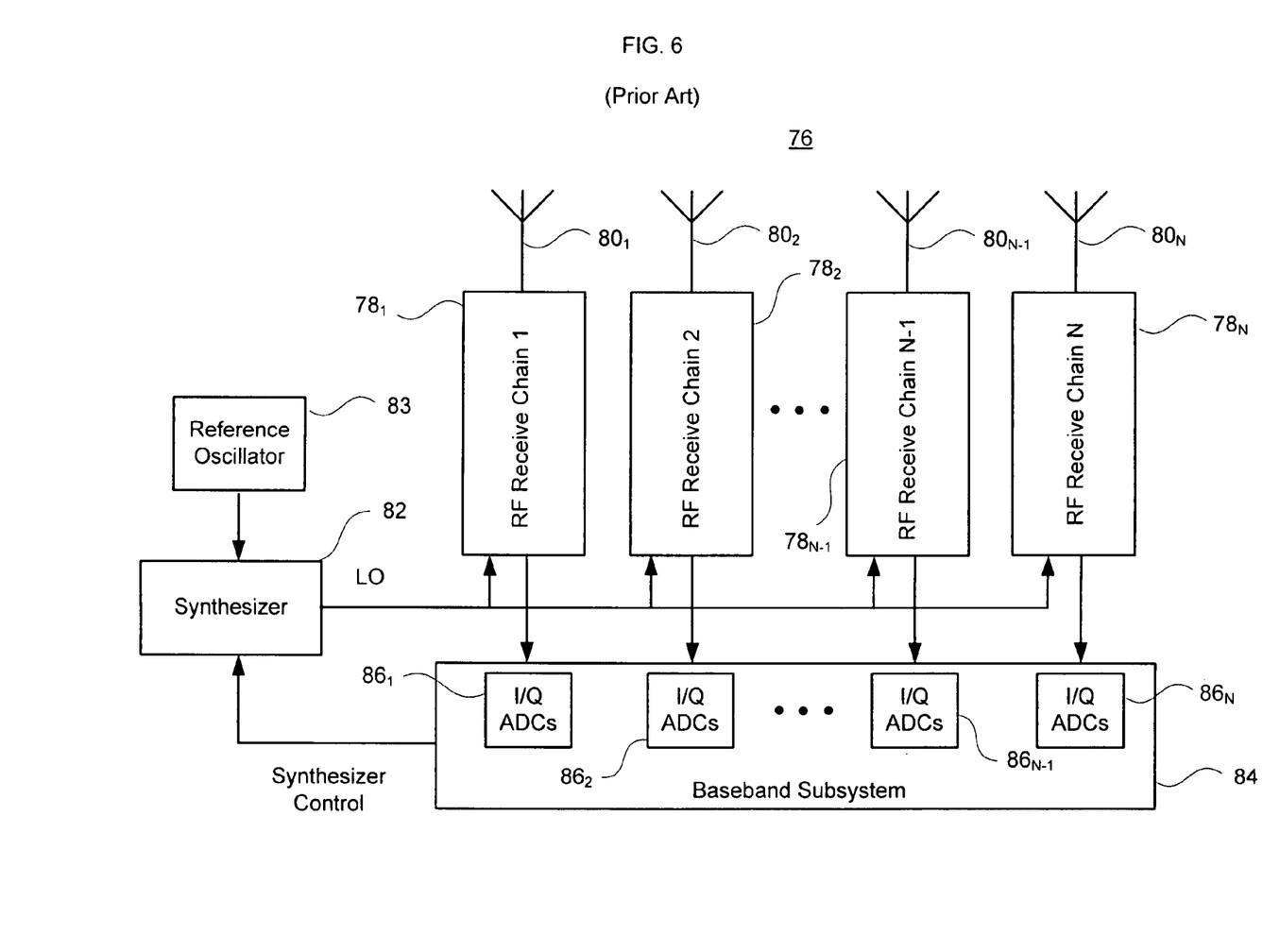
FIG. 6 is a block diagram which illustrates an RF subsystem for a known wireless mobile station having multiple receive chains.

In a conventional receiver with multiple receive chains, the multiple receive chains are all tuned to the same channel. For instance, conventional MIMO systems may employ multiple antennae and multiple RF chains, such as is shown in FIG. 6. As shown, the system 76 includes multiple receive chains $78_1$, $78_2$, ..., $78_{N-1}$, $78_N$. Each receive chain is coupled to a respective antenna $80_1$, $80_2$, ..., $80_{N-1}$, $80_N$. A synthesizer 82, which is fed by a local oscillator LO, is coupled to each of the receive chains. The synthesizer 82 is controlled by the baseband subsystem 84. The baseband subsystem 84 includes respective in-phase and quadrature ("I/Q") ADCs that are coupled to respective in-phase and quadrature signals of the receiver.

Although the use of multiple receive chains in client terminals improves reception performance, the multiple receive chains consume more power which is not desirable, e.g., for battery operated client terminals. The increased power consumption is caused by the additional receive chains in the RF subsystem and their corresponding ADCs and by increased processing carried out in the baseband subsystem due to additional received signals being received through the additional receive chains.

Most wireless communication systems are designed to operate over a coverage area in which the client terminals are able to communicate with the base station or other network entity. The coverage area can vary from few meters to tens of kilometers. The base station adjusts various signal parameters that include, but which are not limited to, transmit power, channel coding, modulation, number of transmit antennas, etc., so that the transmitted signal can be received successfully by all client terminals including ones that are located in the weak signal area. Often, weak signal areas may be found at the edge of the base station's coverage area, although weak signal areas may be anywhere within the base station's coverage area.

Typically, wireless communication systems operate in an environment that includes the following operational scenarios:

The signal conditions for a client terminal may vary for many reasons. For example, signal conditions may vary depending on the location of the client terminal within the base station coverage area. Also, for a given location, the signal conditions for a client terminal may vary due to changes in the environmental factors, such as due to movement of objects in the surrounding area. Typically, the client terminals estimate the signal conditions by taking measurements. Commonly used indicators of such signal conditions include a Received Signal Strength Indicator (RSSI), a Signal-to-Interference-and-Noise Ratio (SINR), a Bit Error Rate (BER), and a Packet Error Rate (PER), though other indicators may be used to estimate the signal conditions. A client terminal may estimate one or more signal conditions indicators through such measurements.

Normally, certain types of system information are required by all client terminals so that they may communicate with the wireless communication network. The system information typically includes synchronization information, system parameters, allocation information, paging information, etc. The base station must transmit such system information as broadcast data so that all client terminals within its coverage area, irrespective of their capabilities or locations, are able to receive and successfully decode the transmitted information. A worst case scenario may be a client terminal with limited capabilities that is located in a weak signal area. Therefore, the parameters of the base station transmit signal that carries the broadcast data are chosen such that all client terminals in its coverage area may have a high probability of receiving and successfully decoding the broadcast data. This situation often leads to scenarios in which the client terminals that are located in a strong signal area may experience signal conditions that are better than necessary to receive and successfully decode the broadcast data.

Typically, multicast payload data is addressed to a subset of client terminals within a base station's coverage area. Examples of multicast payload data include multimedia information about sports, news, traffic, weather, etc. The base station must transmit the multicast payload data in such a manner that all intended client terminals within its coverage area, irrespective of their capabilities or locations, are able to receive and successfully decode the multicast data. Therefore, the parameters of the transmit signal that carries the multicast payload data are chosen such that all intended client terminals have a high probability of receiving and successfully decoding the multicast payload data. Such choices of parameters often lead to scenarios where the client terminals that are located in a strong signal area experience signal conditions that are better than necessary to receive and successfully decode the multicast payload data.

For user payload data, typically the base station uses power control, link adaptation and other mechanisms to ensure that the signal conditions are optimum for each of the client terminals within its coverage area. However, there are practical limitations to the range of power control, link adaptation, and other mechanisms that the base station may employ. Therefore, despite such mechanisms that the base station may employ, there are some scenarios in which the signal conditions for a particular client terminal may be better than is needed to receive and successfully decode the user payload data.

As wireless communication systems continue to evolve, client terminals with different capabilities may coexist within a given coverage area. Also, some client terminals may support some of the optional features of a wireless communication system whereas other client terminals may not. For example, some client terminals may be designed with four receive chains, some with two receive chains, and others with only one receive chain. The performance capabilities of these client terminals thus varies widely, and yet the wireless communication network must be able to communicate with all of the different types of client terminals, each with its different capabilities, within the coverage area. This requirement inevitably leads to scenarios wherein the client terminals with higher performance capabilities experience signal conditions that may be much better than what the terminals need to receive and successfully decode the data.

SUMMARY OF THE INVENTION

In accordance with an aspect of the invention, a wireless communication device is adaptively operated in a wireless communication network. The wireless communication device includes a receiver subsystem having a total number of available receive chains $R_T$. Current signal conditions at the wireless communication device for signals transmitted by a given base station over the wireless communication network are determined. Current system information regarding the wireless communication device and regarding the wireless communication network are determined. Based on the current signal conditions and the current system information, a minimum number of receive chains needed to receive and successfully decode data transmitted by the base station over the wireless communication network is determined. Specific ones of the total number of available receive chains $R_T$ are selected such that the minimum number of receive chains needed to receive and successfully decode the transmitted data is selected.

In accordance with the above aspect of the invention, the selected ones of the total number of available receive chains $R_T$ may have best indicators of the current signal conditions. Data transmitted by the base station over the wireless communication network using only the selected receive chains may be received and decoded. Unselected ones of the total number of available receive chains $R_T$ may be turned off, put into standby mode, or disabled.

The current signal conditions and the current system information may be updated, an updated minimum number of receive chains needed to receive and successfully decode data transmitted by the base station over the wireless communication network may be determined based on the updated current signal conditions and the updated current system information, and specific ones of the total number of available receive chains $R_T$ may be selected such that the updated minimum number of receive chains needed to receive and successfully decode the transmitted data is selected. The current signal conditions and the current system information may be updated using at least one unselected receive chain of the total number of available receive chains $R_T$.

The determining of the current signal conditions at the wireless communication device may include measuring at least one of a received signal strength indicator (RSSI), a signal-to-interference-and-noise ratio (SINR), a bit error rate (BER), or a packet error rate (PER). The current system information regarding the wireless communication device may include at least one air interface parameter. The current system information regarding the wireless communication network may include at least one of synchronization information, system parameters, allocation information, or paging information.

The wireless communication network may be based on an IEEE 802.16e wireless communication standard, an IEEE 802.11 wireless communication standard, an IEEE 802.20 wireless communication standard, a T-DMB wireless communication standard, a DVB-T wireless communication standard, a DVB-H wireless communication standard, a MediaFLO wireless communication standard, Wideband Code Division Multiple Access (WCDMA) wireless communication standard, a 3G-type wireless communication standard, or a Long Term Evolution of a 3G-type wireless communication standard.

The wireless communication network may be an IEEE 802.16e wireless communication system based on an Orthogonal Frequency Division Multiple Access (OFDMA) physical layer, and the determining of the current signal conditions at the wireless communication device may include detecting a preamble symbol of a received data frame and estimating one or more indicators of signal conditions $SC_{EST}[1, 2, \ldots, R_T]$. The selecting of the specific ones of the total number of available receive chains $R_T$ may include generating a list of thresholds $SC_{TH}$ that correspond to minimum values of the one or more indicators of signal conditions that are needed to receive and successfully decode a given received Orthogonal Frequency Division Multiplexing (OFDM) symbol, and comparing the estimated one or more indicators of signal conditions $SC_{EST}[1, 2, \ldots, R_T]$ to the corresponding thresholds $SC_{TH}[\ ]$. The thresholds $SC_{TH}$ may each include a margin of error term that is based on one or more system parameters of the wireless communication device. Further broadcast data may be received from the base station over the wireless communication network, a further preamble symbol of a received data frame of the further broadcast data may be detected, and the one or more indicators of signal conditions $SC_{EST}[1, 2, \ldots, R_T]$ based on the further preamble symbol may be updated.

Another aspect of the invention is a wireless communication device. A radio frequency subsystem includes a transmitter operable to process input signals and to send out the processed input signals over a wireless communication network, and a plurality of receive chains operable to receive signals over the wireless communication network from a base station, and to process the received signals and to output the processed received signals. A control unit is operatively connected to the radio frequency subsystem. The control unit is operable to determine current signal conditions at the wireless communication device for signals transmitted by the base station, to determine current system information regarding the wireless communication device and regarding the wireless communication network, to determine a minimum number of receive chains needed to receive and successfully decode data transmitted by the base station based on the current signal conditions and the current system information, and to select specific ones of the plurality of receive chains such that the minimum number of receive chains needed to receive and successfully decode the transmitted data is selected.

In accordance with this aspect of the invention, the control unit may include at least one of a controller or a signal processing unit. The control unit may select the ones of the plurality of receive chains that have best indicators of the current signal conditions. The radio frequency subsystem may be further operable to receive and successfully decode data transmitted over the wireless communication network by the base station using only the selected receive chains.

The control unit may be further operable to turn off, put into standby mode, or disable unselected ones of the plurality of receive chains. The control unit may be further operable to update the current signal conditions and the current system information, determine an updated minimum number of receive chains needed to receive and successfully decode data transmitted by the base station over the wireless communication network based on the updated current signal conditions and the updated current system information, and select specific ones of the plurality of receive chains such that the updated minimum number of receive chains needed to receive and successfully decode the transmitted data is selected. The control unit may update the current signal conditions and the current system information using at least one unselected receive chain of the plurality of receive chains. The control unit may determine the current signal conditions at the wireless communication device by measuring at least one of a received signal strength indicator (RSSI), a signal-to-interference-and-noise ratio (SINR), a bit error rate (BER), or a packet error rate (PER).

The current system information regarding the wireless communication device may include at least one air interface parameter. The current system information regarding the wireless communication network may include at least one of synchronization information, system parameters, allocation information, or paging information.

A wireless communication network may comprise a plurality of base stations arranged in a cellular configuration, and the wireless communication device in accordance with the above aspect of the invention. The wireless communication network may be based on an IEEE 802.16e wireless communication standard, an IEEE 802.11 wireless communication standard, an IEEE 802.20 wireless communication standard, a T-DMB wireless communication standard, a DVB-T wireless communication standard, a DVB-H wireless communication standard, a MediaFLO wireless communication standard, Wideband Code Division Multiple Access (WCDMA) wireless communication standard, a 3G-type wireless communication standard, or a Long Term Evolution of a 3G-type wireless communication standard. The wireless communication network may be an IEEE 802.16e wireless communication system based on an Orthogonal Frequency Division Multiple Access (OFDMA) physical layer, and the control unit may determine the current signal conditions at the wireless communication device by detecting a preamble symbol of a received data frame and estimating one or more indicators of signal conditions $SC_{EST}[1, 2, \ldots, R_T]$. The control unit may select the specific ones of the total number of available receive chains $R_T$ by generating a list of thresholds $SC_{TH}$ that correspond to minimum values of the one or more indicators of signal conditions that are needed to successfully receive and successfully decode a given received Orthogonal Frequency Division Multiplexing (OFDM) symbol, and comparing the estimated one or more indicators of signal conditions $SC_{EST}[1, 2, \ldots, R_T]$ to the corresponding thresholds $SC_{TH}[\ ]$. The thresholds $SC_{TH}$ may each include a margin of error term that is based on one or more system parameters of the wireless communication device. The control unit may be further operable to receive further broadcast data from the base station over the wireless communication network, detect a further preamble symbol of a received data frame of the further broadcast data, and update the one or more indicators of signal conditions $SC_{EST}[1, 2, \ldots, R_T]$ based on the further preamble symbol.

DETAILED DESCRIPTION

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

The present invention takes advantage of an observation about each of the above-described various operational scenarios of a wireless communication system, namely, that on the average there is a significant period of time where some of the client terminals experience signal conditions better than what is necessary for that terminal to receive and successfully decode different types of transmitted data.

According to an aspect of the current invention, a client terminal with multiple receive chains takes advantage of such better than necessary signal conditions to dynamically select a minimum number of receive chains needed to receive and successfully decode the data. This selection leads to a reduction in the number of receive chains used to receive and successfully decode the data while maintaining required performance. The use of fewer receive chains, on an average, achieves such required performance while reducing power consumption in the client terminal. The reduction in power consumption may be achieved by turning off some of the receive chains and ADCs and/or by reduced processing of received data in the baseband subsystem.

According to another aspect of the invention, the client terminals having multiple receive chains may use indicators of signal conditions and a priori information to determine when, how many of, and which of the available receive chains are required to receive and successfully decode the desired data transmitted by the base station. The indicators of signal conditions may include RSSI, SINR, BER, PER and/or some other metric. The a priori information may include information about the system and the structure of the air interface. To obtain and update the indicators of signal conditions on each available receive chain, the client terminal may turn on the required receive chains, if necessary.

According to yet another aspect of the invention, the indicators of signal conditions may be updated whenever a receive chain is used for normal operation of the client terminal. According to still another aspect of the invention, a receive chain may occasionally be used to specifically update the indicators of signal conditions when required. The client terminal monitors the aging of the indicators of signal conditions for each of the available receive chains and updates the indicators when necessary. The decision to update the indicators of signal conditions may be based on several criteria such as a timer, a rate at which the indicators of signal conditions vary, and the a priori information itself.

The duration for which the client terminal may use the required receive chains specifically to update the indicators of signal conditions may be a relatively small percentage of the total duration of normal receive operation. By contrast, conventional client terminals having multiple receive chains typically use all of the available receive chains whenever a receive operation is scheduled, regardless of whether all of these receive chains are necessary to successfully decode the information transmitted by the base station.

Figure 7:
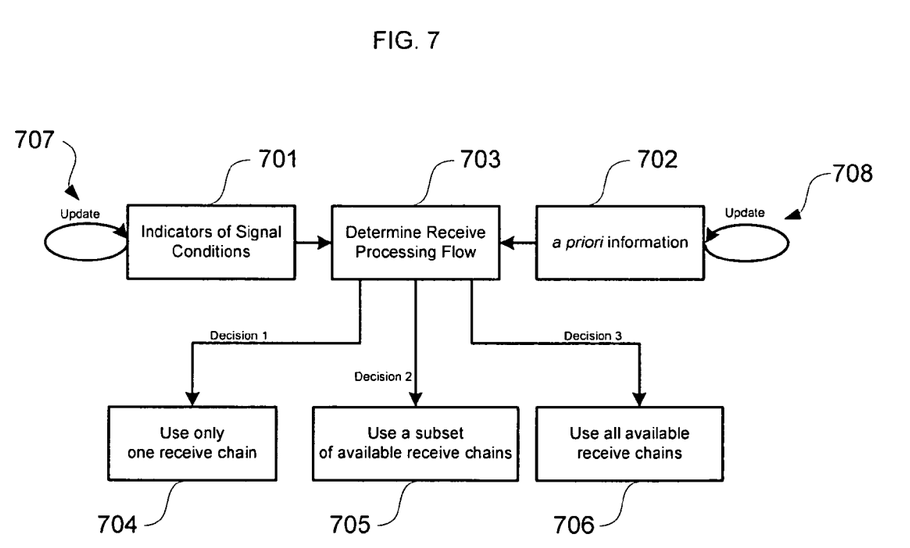
FIG. 7 is a flow diagram illustrating the adaptive use of multiple receive chains in accordance with the present invention.

According to a further aspect of the current invention, the indicators of signal conditions, in conjunction with the a priori information, are used to periodically determine when, how many of, and which of the receive chains may be required to receive and successfully decode the desired data, as shown in FIG. 7. The client terminal makes one of the following three decisions as illustrated in FIG. 7:

Decision 1.

The indicators of signal conditions 701 and the a priori information 702 lead to a determination 703 that using one of the receive chains is sufficient to receive and successfully decode the desired data (704). Only one particular receive chain, having the best indicators of signal conditions, is used for receiving and processing the data. The remaining receive chains are turned off, put into standby mode, or otherwise disabled to save power, though such action is not required.

Decision 2.

The signal indicators of conditions 701 and the a priori information 702 lead to a determination 703 that no single receive chain is sufficient by itself to receive and successfully decode the desired data. However, using signals from some subset of available receive chains is sufficient to receive and successfully decode the desired data (705). A selected subset of receive chains are used while the remaining receive chains may be turned off, put into standby mode or otherwise disabled to save power, though such action is not required.

Decision 3.

The indicators of signal conditions 701 and the a priori information 702 lead to a determination 703 that all of the available receive chains are needed to receive and successfully decode the desired data (706).

Decision 1 may be made, for example, when a client terminal is in strong signal coverage area. Decision 3 may be made, for example, when the client terminal is in a weak signal coverage area. Decision 2 may be made, for example, when the client terminal is neither in a weak signal coverage area nor a strong signal coverage area. Whenever Decision 1 or Decision 2 is made, significant reduction in power consumption may be achieved in the client terminal. Namely, turning off a receive chain means turning off its RF section and turning off its ADCs and leads to reduction in processing in the baseband subsystem. Turning off multiple receive chains thus leads to multi-fold reduction in the power consumption of the client terminal.

According to a still further aspect of the invention, the client terminal may reevaluate its decision about when, how many of, and which ones of the receive chains are to be used whenever there is an update of the indicators of signal conditions 701 and/or change in the a priori information 702.

Sometimes, the actual signal conditions may vary more rapidly. Also, the estimation process may introduce estimation errors. The rapid variation in actual signal conditions and the error that may occur in the estimation process itself may lead to scenarios where the estimated signal conditions may be different than the actual signal conditions. To minimize the effect of such a difference between the estimated signal conditions and the actual signal conditions, a margin of error is included in the thresholds for the indicators of signal conditions. According to another aspect of the invention, the margin may be adapted based on the parameters of the wireless communication system.

In accordance with such aspects of the present invention, the adaptive use of multiple receive chains, such as is shown in FIG. 7, may be applied to various wireless communications systems such as an IEEE 802.16e based wireless communication system. While examples are provided herein with reference to an IEEE 802.16e-type system, aspects of the present invention may be applied to all types of wireless communications systems and the like that use multiple receive chains, such as for IEEE 802.11, IEEE 802.20, T-DMB, DVB-T, DVB-H, MediaFLO, Wideband Code Division Multiple Access (WCDMA) and Long Term Evolution of 3G-type systems.

Benefits of the invention are illustrated when the invention is applied to a client terminal of an IEEE 802.16e wireless communication system that is based on an Orthogonal Frequency Division Multiple Access (OFDMA) physical layer. The client terminal for this communication system is designed with multiple receive chains to improve performance using different combining and decoding techniques.

Figure 8:
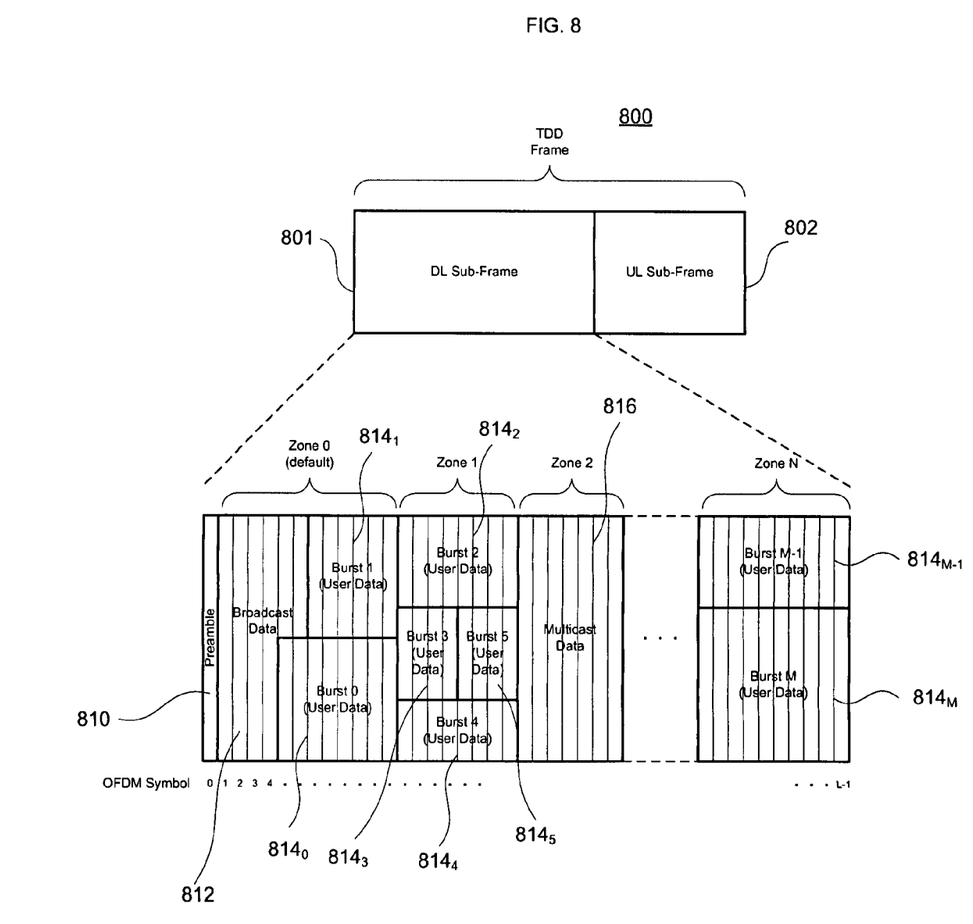
FIG. 8 illustrates an exemplary frame structure of an IEEE 802.16e wireless communication system based on an OFDMA physical layer.

FIG. 8 shows an example of a Time Division Duplex (TDD) frame structure used by the IEEE 802.16e wireless communication system based on Orthogonal Frequency Division Multiple Access (OFDMA) physical layer. Normally, a frame is comprised of a set of Orthogonal Frequency Division Multiplexing (OFDM) symbols. A TDD frame is divided into two sub-frames, namely, one for the DL direction 801 and the other for the UL direction 802. A sub-frame is typically divided into zones 0, 1, 2, ..., N, where each zone is defined by a particular set of parameters such as a Space Time Coding (STC) type, an STC matrix, etc. Some STC types are classified as MIMO. Each zone is further divided into bursts and each burst has a particular set of parameters such as its modulation, coding type, coding rate, etc. The combination of zone and burst parameters is used to derive the parameters of each OFDM symbol in a particular frame. The OFDM symbol parameters are then used as part of the a priori information for the decision making process for the rest of the frame. The frame structure of IEEE 802.16e wireless communication system based on OFDMA physical layer is designed with different zones and burst parameters to allow client terminals with different capabilities to coexist within a given base station coverage area. The subset of parameters used by the first few OFDM symbols of the frame may be known a priori as defined in the IEEE 802.16e air interface standard. The first few OFDM symbols in a given frame are used to transmit broadcast data and the resource allocation messages. The parameters of the rest of the OFDM symbols in the frame may vary from frame to frame and are known only after the client terminal receives and decodes the resource allocation messages.

In the IEEE 802.16e wireless communication system based on OFDMA physical layer, the first OFDM symbol of a frame is a preamble symbol 810, followed by variable length broadcast data 812. The broadcast data is followed by the user payload data $814_0, 814_1, \ldots, 814_M$ and multicast data 816. The user payload data and the multicast data are not necessarily transmitted in any particular order. The preamble symbol 810 enables the client terminals to perform time and frequency synchronization and to estimate some indicators of signal conditions. Some of the indicators of the signal conditions, for example, RSSI and SINR, may be estimated using the preamble symbol separately on all the available receive chains for the frames for which a receive operation is scheduled. It is to be noted that the frame shown in FIG. 8 is only an example and not all of the data types shown may be present in all such frames.

Figure 9:
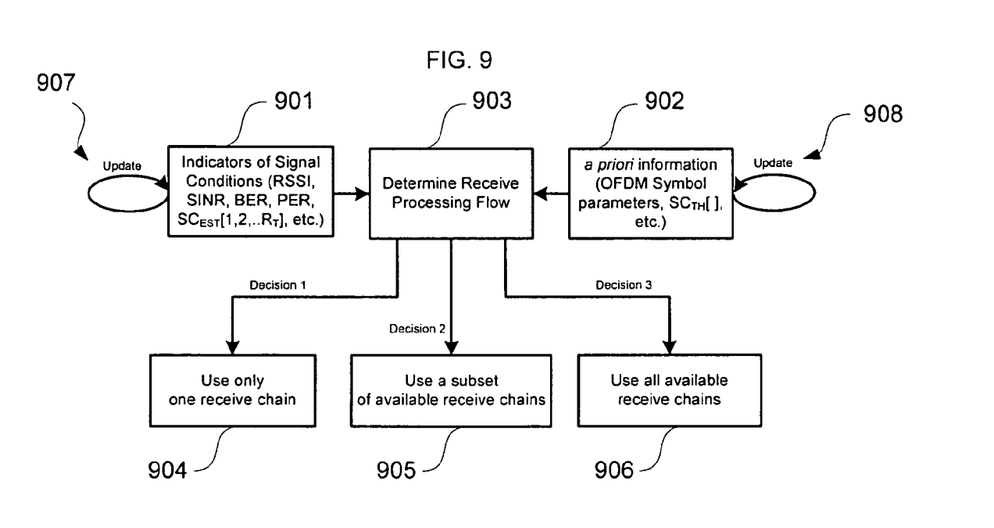
FIG. 9 is a flow diagram illustrating adaptive use of multiple receive chains as applied to an example in accordance with aspects of the present invention.

FIG. 9 shows the decisions that are available for the IEEE 802.16e wireless communication system described above. Indicators of the signal conditions 901, in conjunction with a priori information about the OFDM symbol parameters 902 and the structure of the air interface defined in the IEEE 802.16e standard, are used to decide 903 when, how many of, and which of the receive chains are used on an OFDM symbol by symbol basis for the rest of the frame as shown by decisions 904, 905, and 906 in FIG. 9.

Conventionally, whenever the receive operation is scheduled, client terminals with multiple receive chains use all of the available receive chains for an entire intended receive portion of the frame regardless of whether all of these receive chains are needed to receive and successfully decode the desired data.

For the IEEE 802.16e wireless communication system based on OFDMA physical layer, some broadcast data is transmitted with parameters such that a client terminal having only minimum required capabilities is able to receive and successfully decode data within the base station's coverage area. For example, a client terminal with minimum required capability may be designed with only one receive chain. Therefore, Decision 1 may be applied by other client terminals, which are designed with multiple receive chains, to receive and successfully decode the broadcast data within most of the base station's coverage area using a single receive chain. The remaining receive chains may be turned off, put into standby mode or otherwise disabled to save power, although this action is not required.

In addition to the portion of the frame used for broadcast data, the indicators of signal conditions may be higher than necessary, on the average, for a significant portion of the frame for client terminals designed with multiple receive chains. This, in turn, may lead such client terminals to make Decision 1 or Decision 2 for a significant portion of the frame, on the average, leading to a significant reduction in power consumption in such client terminals designed with multiple receive chains.

In the IEEE 802.16e wireless communication system based on OFDMA physical layer, there are different power saving modes of operation such as idle mode and sleep mode. In these power saving modes, in general, the client terminal is required to receive only a pre-determined set of frames. According to the current invention, the client terminal is only required to estimate the indicators of the signal conditions only during the frames that the terminal is required to receive.

In wireless communication systems, different indicators of signal conditions are used for link management purposes such as for power control, link adaptation, handovers, etc. For link management purposes, different indicators of signal conditions may be estimated and updated periodically. The invention uses the available indicators of signal conditions estimated for the link management purposes for the adaptive use of multiple receive chains method described herein. However, additional estimates may be performed if required by the method described herein.

Based on the a priori information about the parameters of the OFDM symbols in a frame, a list of thresholds $SC_{TH}$ that correspond to the minimum values of the indicators of signal conditions to receive and successfully decode a given OFDM symbol may be determined based on simulations, laboratory experiments and field testing. The value of these thresholds may be determined as a function of some of the following air interface parameters which may be used by the IEEE 802.16e wireless communication system based on OFDMA physical layer:

Modulation Type: Quadrature Phase Shift Keying (QPSK), 16-Quadrature Amplitude Modulation (QAM), and 64-QAM, Channel Coding Type: convolutional codes and turbo codes, Channel Coding Rate: $\frac{1}{2}$, $\frac{2}{3}$, $\frac{3}{4}$, and $\frac{5}{6}$, Repetition Coding: repeat 0, 2, 4, and 6 times, Power Boosting: various signals may optionally be transmitted with boosted power, STC: No STC, or STC with two, three, or four antennas with different STC matrices, and Hybrid Automatic Repeat Request (HARQ): No HARQ, Chase HARQ, or Incremental Redundancy HARQ.

The minimum required threshold for a given set of parameters may be different for each different number of receive chains that may be used. As an example, a client terminal with four available receive chains is used. For such a client terminal, the minimum required threshold value for a given set of parameters may be $SC_{TH1}$ when using only one of the four receive chains. When using two of the four receive chains, the minimum required threshold value for a given set of parameters may be $SC_{TH2}$. When using three of the four receive chains, the minimum required threshold value for a given set of parameters may be $SC_{TH3}$. When using all four receive chains, the minimum required threshold value for a given set of parameters may be $SC_{TH4}$. Normally, $SC_{TH1} > SC_{TH2} > SC_{TH3} > SC_{TH4}$ for a given set of parameters.

The estimated signal conditions indicators $SC_{EST}$ are compared against the signal condition thresholds $SC_{TH}$ to determine when, how many of, and which of the receive chains are to be used.

The determination of thresholds takes into account that the estimated indicators of the signal conditions sometimes may be less reliable and that the actual signal conditions may vary rapidly. To minimize the effect of differences between the estimated signal conditions and the actual signal conditions, a margin of error is included in the thresholds for the indicators of signal conditions. According to an aspect of the invention described herein, the margin may be adapted based on the parameters of the wireless communication system. For example, when HARQ is used for an OFDM symbol, a smaller margin of error may be used to determine the threshold when compared to an OFDM symbol with no HARQ. This lower performance margin, on an average, requires a smaller number of receive chains.

Aspects of the present invention may be implemented in firmware of a controller/processor of the client terminal, such as an MCU or SPU of the baseband subsystem. For example, the present invention may be implemented in the MCU 22 or SPU 24 of the baseband subsystem 16 shown in FIG. 3 or may be implemented in an MCU or SPU of some other baseband subsystem arrangement.

Alternatively, aspects of the present invention may be implemented as a combination of firmware and hardware of the baseband subsystem and the RF subsystem. For example, the present invention may be implemented as a combination of firmware and hardware of the baseband subsystem 16 and the RF subsystem 18 shown in FIGS. 3 and 4, respectively, or may be implemented as a combination of firmware and hardware of some other baseband subsystem and RF subsystem arrangement. The software may reside in internal or external memory, and data may be stored in such memory. As an example, such software and data may be stored in the external memory 20 of the client terminal shown in FIG. 2 or may reside in internal or external memory of another arrangement of a client terminal or other wireless communication device. The hardware may be an application specific integrated circuit ("ASIC"), a field programmable gate array ("FPGA"), discrete logic components, or any combination of such devices.

The RF subsystem of the client terminal may be controlled by the MCU or the SPU of the baseband subsystem. For example, the RF subsystem 18 shown in FIG. 4 or some other RF subsystem arrangement may be controlled by the MCU 22 or SPU 24 of the baseband subsystem 16 shown in FIG. 3 or may be controlled by an MCU or SPU of some other baseband subsystem arrangement. Alternatively, the RF subsystem of the client terminal may be controlled by a dedicated subsystem controller, by other processors, or the like. The terms controller and processor are used interchangeably herein.

Figure 10A:
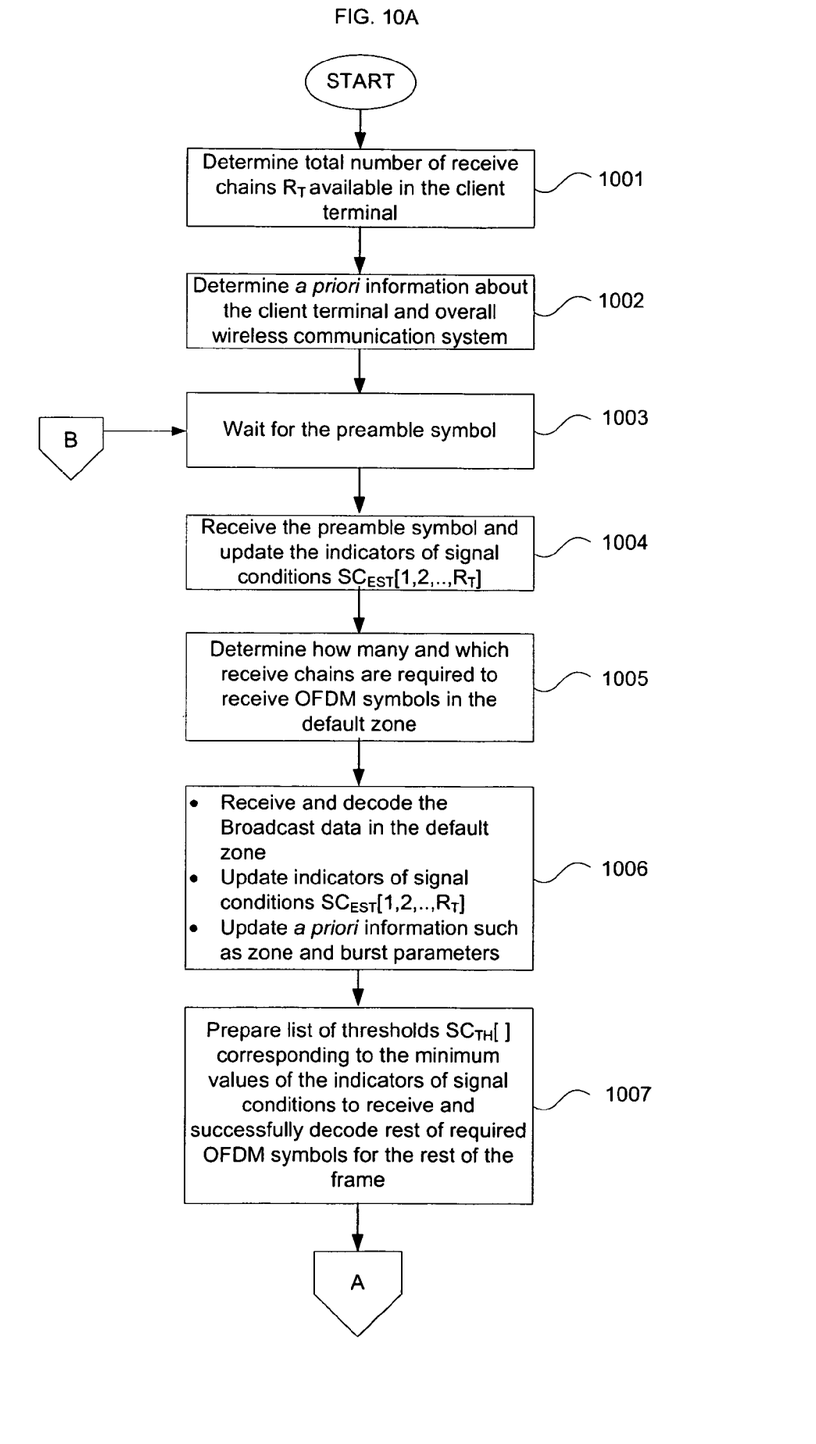
FIGS. 10A-B is a flow diagram illustrating a process for adaptive use of multiple receive chains applied to the chosen example in accordance with aspects of the present invention.
Figure 10B:
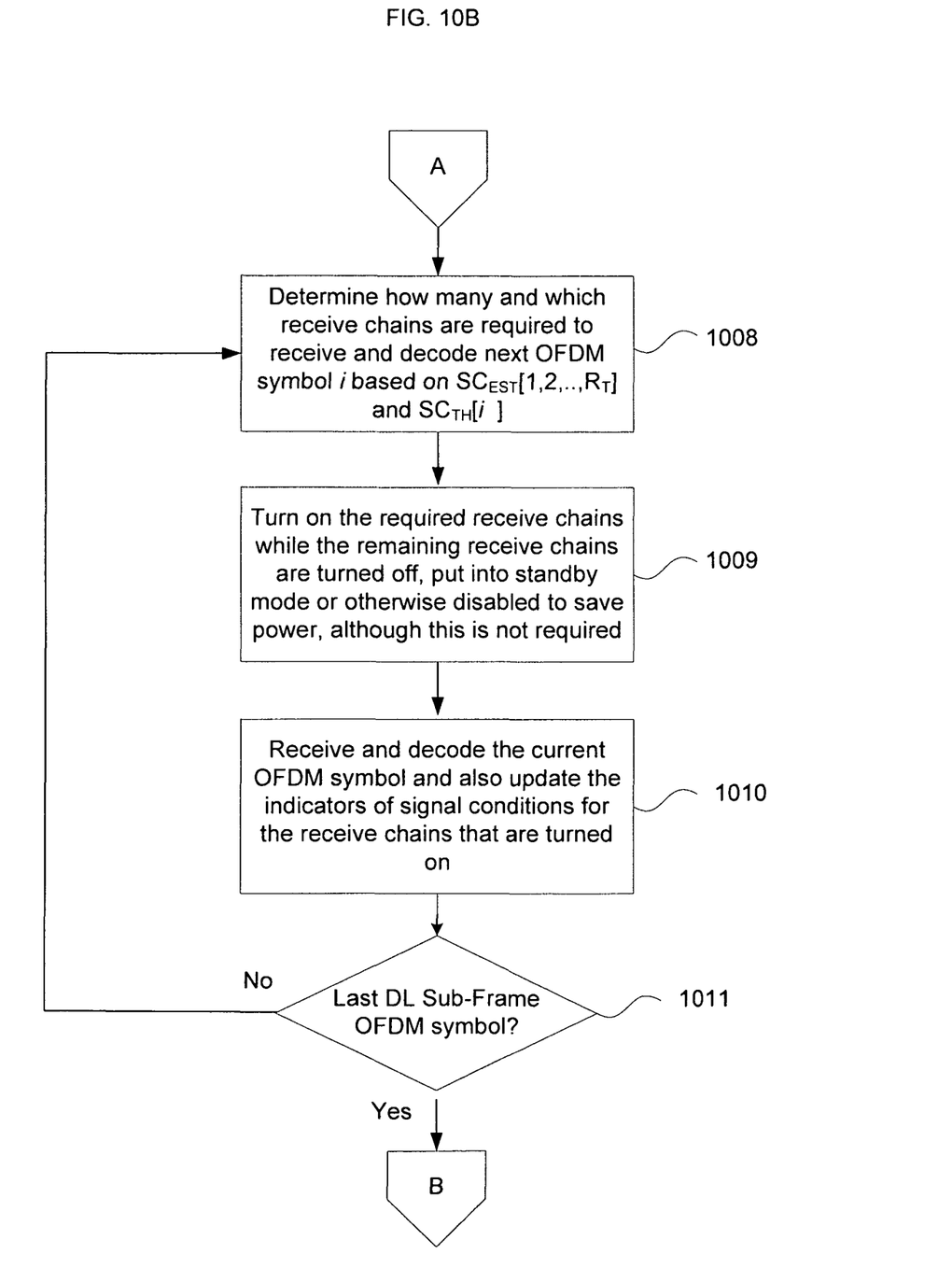

FIGS. 10A-B illustrates a flow diagram of an algorithm that dynamically determines when, how many of, and which of the receive chains may be used in accordance with the invention described herein for the above-chosen example.

First, as Step 1001 shows, a total number of receive chains $R_T$ that are available in a given client terminal is determined. Next, as Step 1002 shows, a priori information about the client terminal and a priori information about the overall wireless communication system are determined in the manner set out above. For example, for the IEEE 802.16e wireless communication system based on OFDMA physical layer, a priori information about the air interface, such as the first OFDM symbol in the frame being a preamble, is determined. This information about the first OFDM symbol of the frame may be used to estimate the indicators of signal conditions on all of the available receive chains, as described above. Then, as shown in Step 1003, the client terminal waits until a TDD frame having a preamble symbol is received, and the preamble symbol is used to update one or more indicators of signal conditions $SC_{EST}[1, 2, \ldots, R_T]$, as Step 1004 shows. The client terminal then determines how many of and which of the receive chains of the client terminal are required for receiving OFDM symbols in a default zone, as shown in Step 1005.

Subsequently, as shown in Step 1006, the client terminal receives and decodes broadcast data, updates the indicators of the signal conditions $SC_{EST}[1, 2, \ldots, R_T]$ based on the decoded broadcast data, and estimates the a priori information such as using zone and burst parameters. Next, the list of thresholds $SC_{TH}[\ ]$ is prepared in the manner described above, as Step 1007 shows, and corresponds to the minimum values of the indicators of signal conditions needed to receive and successfully decode the rest of the required OFDM symbols of the rest of the frame. Then, as Step 1008 shows, the number and which of the received chains that are required to receive and successfully decode the next OFDM symbol is determined based on the estimated indicators of signal conditions $SC_{EST}[1, 2, \ldots, R_T]$ and the threshold associated with that OFDM symbol $SC_{TH}[i]$. Then, as shown in Step 1009, the required receive chains are turned on. Additionally, the remaining receive chains may be turned off, put into standby mode, or otherwise disabled to save power, though such operations are not required. Next, the current OFDM symbol is received and decoded, and the indicators of signal conditions for the currently turned on receive chains are updated. Thereafter, as Step 1011 shows, the Steps 1008, 1009, and 1010 are repeated until the last OFDM symbol of the DL direction sub-frame is processed in this manner.

In accordance with aspects of the present invention, a significant reduction in power consumption may be achieved. The power savings offered by the current invention is important in general and is significant for battery operated client terminals.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of adaptively operating a wireless communication device in a wireless communication network, the wireless communication device including a receiver subsystem having a total number of available receive chains $R_T$, the method comprising:
   determining current signal conditions at the wireless communication device for signals transmitted by a given base station over the wireless communication network;
   determining a priori system information regarding the wireless communication device and regarding the wireless communication network, wherein the a priori system information includes one or more selected from the group consisting of modulation type, channel coding type, channel coding rate, repetition coding, power boosting information, space-time coding information and hybrid automatic repeat request information;
   determining, based on the current signal conditions and the a priori system information, a minimum number of receive chains needed to receive and successfully decode data transmitted by the base station over the wireless communication network; and
   selecting specific ones of the total number of available receive chains $R_T$ such that the minimum number of receive chains needed to receive and successfully decode the transmitted data is selected.

2. The method according to claim 1, wherein the selected ones of the total number of available receive chains $R_T$ have best indicators of the current signal conditions.

3. The method according to claim 1, further comprising:
   receiving and decoding data transmitted by the base station over the wireless communication network using only the selected receive chains.

4. The method according to claim 1, further comprising:
   turning off, putting into standby mode, or disabling unselected ones of the total number of available receive chains $R_T$.

5. The method according to claim 1, further comprising:
   updating the current signal conditions and the a priori system information, and
   determining, based on the updated current signal conditions and the updated system information, an updated minimum number of receive chains needed to receive and successfully decode data transmitted by the base station over the wireless communication network; and
   selecting specific ones of the total number of available receive chains $R_T$ such that the updated minimum number of receive chains needed to receive and successfully decode the transmitted data is selected.

6. The method according to claim 5, wherein updating the current signal conditions and the a priori system information is carried out using at least one unselected receive chain of the total number of available receive chains $R_T$.

7. The method according to claim 1, wherein the step of determining the current signal conditions at the wireless communication device includes measuring at least one of a received signal strength indicator (RSSI), a signal-to-interference-and-noise ratio (SINR), a bit error rate (BER), or a packet error rate (PER).

8. The method according to claim 1, wherein the wireless communication network is based on an IEEE 802.16e wireless communication standard, an IEEE 802.11 wireless communication standard, an IEEE 802.20 wireless communication standard, a T-DMB wireless communication standard, a DVB-T wireless communication standard, a DVB-H wireless communication standard, a MediaFLO wireless communication standard, Wideband Code Division Multiple Access (WCDMA) wireless communication standard, a 3G-type wireless communication standard, or a Long Term Evolution of a 3G-type wireless communication standard.

9. The method according to claim 1, wherein the wireless communication network is an IEEE 802.16e wireless communication system based on an Orthogonal Frequency Division Multiple Access (OFDMA) physical layer, and the step of determining the current signal conditions at the wireless communication device includes detecting a preamble symbol of a received data frame and estimating one or more indicators of signal conditions $SC_{EST}[1, 2, \ldots, R_T]$.

10. The method according to claim 9, wherein the step of selecting the specific ones of the total number of available receive chains $R_T$ includes generating a list of thresholds $SC_{TH}$ that correspond to minimum values of the one or more indicators of signal conditions that are needed to receive and successfully decode a given received Orthogonal Frequency Division Multiplexing (OFDM) symbol, and comparing the estimated one or more indicators of signal conditions $SC_{EST}[1, 2, \ldots, R_T]$ to the corresponding thresholds $SC_{TH}[\ ]$.

11. The method according to claim 9, wherein the thresholds $SC_{TH}$ each include a margin of error term that is based on one or more system parameters of the wireless communication device.

12. The method according to claim 9, further comprising:
receiving further broadcast data from the base station over the wireless communication network,
detecting a further preamble symbol of a received data frame of the further broadcast data, and
updating the one or more indicators of signal conditions $SC_{EST}[1, 2, \ldots, R_T]$ based on the further preamble symbol.

13. A wireless communication device, comprising:
a radio frequency subsystem, including:
a transmitter operable to process input signals and to send out the processed input signals over a wireless communication network, and
a plurality of receive chains operable to receive signals over the wireless communication network from a base station, and to process the received signals and to output the processed received signals; and
a control unit operatively connected to the radio frequency subsystem, the control unit being operable to determine current signal conditions at the wireless communication device for signals transmitted by the base station, to determine a priori system information regarding the wireless communication device and regarding the wireless communication network, to determine a minimum number of receive chains needed to receive and successfully decode data transmitted by the base station based on the current signal conditions and the a priori system information, and to select specific ones of the plurality of receive chains such that the minimum number of receive chains needed to receive and successfully decode the transmitted data is selected;
wherein the a priori system information includes one or more selected from the group consisting of modulation type, channel coding type, channel coding rate, repetition coding, power boosting information, space-time coding information and hybrid automatic repeat request information.

14. The wireless communication device according to claim 13, wherein the control unit includes at least one of a controller or a signal processing unit.

15. The wireless communication device according to claim 13, wherein the control unit selects the ones of the plurality of receive chains that have best indicators of the current signal conditions.

16. The wireless communication device according to claim 13, wherein the radio frequency subsystem is further operable to receive and successfully decode data transmitted over the wireless communication network by the base station using only the selected receive chains.

17. The wireless communication device according to claim 13, wherein the control unit is further operable to turn off, put into standby mode, or disable unselected ones of the plurality of receive chains.

18. The wireless communication device according to claim 17, wherein the control unit updates the current signal conditions and the a priori system information using at least one unselected receive chain of the plurality of receive chains.

19. The wireless communication device according to claim 13, wherein the control unit is further operable to update the current signal conditions and the a priori system information, determine an updated minimum number of receive chains needed to receive and successfully decode data transmitted by the base station over the wireless communication network based on the updated current signal conditions and the updated system information, and select specific ones of the plurality of receive chains such that the updated minimum number of receive chains needed to receive and successfully decode the transmitted data is selected.

20. The wireless communication device according to claim 13, wherein the control unit determines the current signal conditions at the wireless communication device by measuring at least one of a received signal strength indicator (RSSI), a signal-to-interference-and-noise ratio (SINR), a bit error rate (BER), or a packet error rate (PER).

21. A wireless communication network, comprising:
a plurality of base stations arranged in a cellular configuration; and
the wireless communication device according to claim 13.

22. The wireless communication network according to claim 21, wherein the wireless communication network is based on an IEEE 802.16e wireless communication standard, an IEEE 802.11 wireless communication standard, an IEEE 802.20 wireless communication standard, a T-DMB wireless communication standard, a DVB-T wireless communication standard, a DVB-H wireless communication standard, a MediaFLO wireless communication standard, Wideband Code Division Multiple Access (WCDMA) wireless communication standard, a 3G-type wireless communication standard, or a Long Term Evolution of a 3G-type wireless communication standard.

23. The wireless communication network according to claim 21, wherein the wireless communication network is an IEEE 802.16e wireless communication system based on an Orthogonal Frequency Division Multiple Access (OFDMA) physical layer, and the control unit determines the current signal conditions at the wireless communication device by detecting a preamble symbol of a received data frame and estimating one or more indicators of signal conditions $SC_{EST}[1, 2, \ldots, R_T]$.

24. The wireless communication network according to claim 21, wherein the control unit selects the specific ones of the total number of available receive chains $R_T$ by generating a list of thresholds $SC_{TH}$ that correspond to minimum values of the one or more indicators of signal conditions that are needed to successfully receive and successfully decode a given received Orthogonal Frequency Division Multiplexing (OFDM) symbol, and comparing the estimated one or more indicators of signal conditions $SC_{EST}[1, 2, \ldots, R_T]$ to the corresponding thresholds $SC_{TH}[\ ]$.

25. The wireless communication network according to claim 21, wherein the thresholds $SC_{TH}$ each include a margin of error term that is based on one or more system parameters of the wireless communication device.

26. The wireless communication network according to claim 21, wherein the control unit is further operable to receive further broadcast data from the base station over the wireless communication network, detect a further preamble symbol of a received data frame of the further broadcast data, and update the one or more indicators of signal conditions $SC_{EST}[1, 2, \ldots, R_T]$ based on the further preamble symbol.

* * * * *